United States Patent
Hicks

(10) Patent No.: US 6,895,428 B2
(45) Date of Patent: May 17, 2005

(54) METHOD OF STORING E-MAIL ADDRESS INFORMATION ON A SIM CARD

(75) Inventor: Scott G. Hicks, Wake County, NC (US)

(73) Assignee: Ericsson Inc., Research Triangle Park, NC (US)

( * ) Notice: Subject to any disclaimer, the term of this patent is extended or adjusted under 35 U.S.C. 154(b) by 675 days.

(21) Appl. No.: 09/767,110

(22) Filed: Jan. 21, 2001

(65) Prior Publication Data

US 2002/0099846 A1 Jul. 25, 2002

(51) Int. Cl.[7] ............................................. G06F 15/16
(52) U.S. Cl. ...................... 709/206; 709/207; 709/236; 379/355.01; 711/115
(58) Field of Search ................................ 709/206, 207, 709/236; 379/93.24, 355.02, 355.03, 357.01, 355.01; 711/145; 707/10

(56) References Cited

U.S. PATENT DOCUMENTS

| | | | | |
|---|---|---|---|---|
| 6,084,969 A | * | 7/2000 | Wright et al. ............... | 380/271 |
| 6,175,741 B1 | * | 1/2001 | Alperovich ................. | 455/458 |
| 6,309,305 B1 | * | 10/2001 | Kraft ........................... | 455/556 |
| 6,411,822 B1 | * | 6/2002 | Kraft ........................... | 455/566 |
| 6,484,039 B1 | * | 11/2002 | Volland et al. ............. | 455/558 |
| 6,641,037 B2 | * | 11/2003 | Williams ..................... | 235/383 |
| 6,694,152 B1 | * | 2/2004 | Helle .......................... | 455/558 |

* cited by examiner

Primary Examiner—William C. Vaughn, Jr.
Assistant Examiner—J Bret Dennison
(74) Attorney, Agent, or Firm—Coats & Bennett, P.L.L.C.

(57) ABSTRACT

A method of storing an e-mail address within an Abbreviated Dialing Number (ADN) record of a Subscriber Identity Module (SIM) card is provided. The ADN record typically includes a plurality of fields having personal contact information relating to a contact stored in the ADN record. The inventive method includes the steps of allocating a first number of bytes of memory space to a first field in the ADN record, storing an e-mail address of a contact in the first field in the ADN record, and setting a flag in a second field in the ADN record indicating a presence of a e-mail address in the first field in the ADN record.

21 Claims, 6 Drawing Sheets

| Bytes | Description | Value (hex) | Explanation |
|---|---|---|---|
| 1 to X | Alpha Identifier | 03 | ADN record 3 (contact's phone number and Alpha Tag stored in record 3) |
| | | 02 | EXT1 record 2 (remaining portion of e-mail address stored in EXT1 record 2) |
| | | 0B | Address length within record–11 octets |
| | | 73 61 6D 70 6C 65 00 6E 6F 74 2E | sample@not. |
| X+1 | Length of BCD number/SSC contents | 01 | 1 byte-the TON/NPI |
| X+2 | TON and NPI | 8E | '1 Always 1 000 – TON 1110 – NPI (Alpha Internet Addr) |
| X+3 to X+12 | Dialing Number/SSC String | FF FF FF FF FF FF FF FF FF FF | No dialing num for backward compatibility |
| X+13 | Capability/Configuration Identifier | FF | No record pointer |
| X+14 | Extension1 Record Identifier | FF | No record pointer |

| | | | | |
|---|---|---|---|---|
| Identifier: '6F3A' | | Structure: linear fixed | | Optional |
| Record length: X+14 bytes | | | Update activity: low | |
| Access Conditions:<br>    READ                    CHV1<br>    UPDATE          CHV1<br>    INVALIDATE     CHV2<br>    REHABILITATE  CHV2 | | | | |
| Bytes | Description | | M/O | Length |
| 1 to X | Alpha Identifier | | O | X bytes |
| X+1 | Length of BCD number/SSC contents | | M | 1 byte |
| X+2 | TON and NPI | | M | 1 byte |
| X+3 to X+12 | Dialing Number/SSC String | | M | 10 bytes |
| X+13 | Capability/Configuration Identifier | | M | 1 byte |
| X+14 | Extension1 Record Identifier | | M | 1 byte |

FIG. 3
(PRIOR ART)

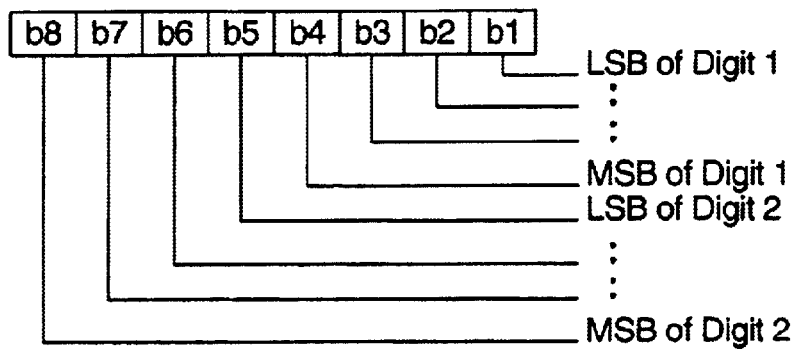

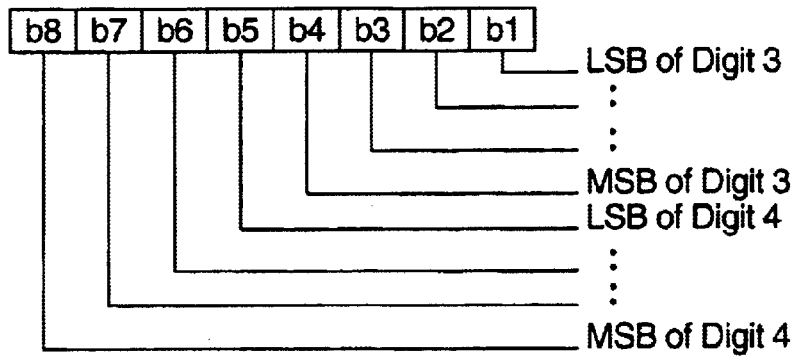

FIG. 4

| Bytes | Description | Value (hex) | Explanation |
|---|---|---|---|
| 1 to X | Alpha Identifier | 03 | ADN record 3 (contact's phone number and Alpha Tag stored in record 3) |
| | | 02 | EXT1 record 2 (remaining portion of e-mail address stored in EXT1 record 2) |
| | | 0B | Address length within record–11 octets |
| | | 73 61 6D 70 6C 65 00 6E 6F 74 2E | sample@not. |
| X+1 | Length of BCD number/SSC contents | 01 | 1 byte-the TON/NPI |
| X+2 | TON and NPI | 8E | '1 Always 1 000 – TON 1110 – NPI (Alpha Internet Addr) |
| X+3 to X+12 | Dialing Number/SSC String | FF FF FF FF FF FF FF FF FF FF | No dialing num for backward compatibility |
| X+13 | Capability/Configuration Identifier | FF | No record pointer |
| X+14 | Extension1 Record Identifier | FF | No record pointer |

FIG. 6

EXT Record 2

| Bytes | Description | Value (hex) | Explanation |
|---|---|---|---|
| 1 | Record Type | 02 | Additional data |
| 2 to 12 | Extension data | 04 / 65 61 6C 72 FF FF FF FF FF FF | Remaining length of 4 octets <u>real</u> Remaining octets coded as 'FF' |
| 13 | Identifier | FF | No extension needed |

FIG. 7

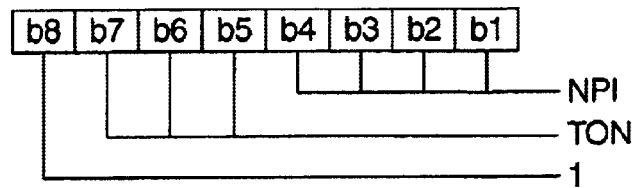

FIG. 8

| Bytes | Description | Value (hex) | Explanation |
|---|---|---|---|
| 1 to X | Alpha Identifier | FF<br>FF<br>0F<br><br>73 61 6D 70<br>6C 65 00 6E 6F<br>74 2E 72 65 61<br>6C<br>73 61 6D 70 6C<br>65 | No existing contact<br>No EXT1 record<br>Address length of 15 octets<br><br>Sample@not.real<br><br><br><br>Alpha Tag= "sample" |
| X+1 | Length of BCD number/SSC contents | 01 | 1 byte-the TON/NPI |
| X+2 | TON and NPI | 8E | '1 Always 1<br>000 - TON<br>1110 - NPI (Alpha Internet Addr) |
| X+3 to X+12 | Dialing Number/SSC String | FF FF FF FF FF<br>FF FF FF FF FF | No dialing num for backwards compatibility |
| X+13 | Capability/Configuration Identifier | FF | No record pointer |
| X+14 | Extension1 Record Identifier | FF | No record pointer |

FIG. 9

| Bytes | Description | Value (hex) | Explanation | |
|---|---|---|---|---|
| 1 to X | Alpha Identifier | 03 | ADN record 3 (contact's phone number and Alpha Tag stored in record 3) | 76 |
| | | 02 | EXT1 record 2 (remaining portion of e-mail address stored in EXT1 record 2) | 78 |
| | | 0B | Addr length within record-11 octets | 80 |
| | | 73 61 6D 70 6C 65 00 6E 6F 74 2E | sample@not. | 82 |
| X+1 | Length of BCD number/SSC contents | 02 | 2 bytes-the TON/NPI and 1 digit number | 64' |
| X+2 | TON and NPI | 8E | '1 Always 1 000 – TON 1110 – NPI (Alpha Internet Addr) | 66 |
| X+3 to X+12 | Dialing Number/SSC String | F0 FF FF FF FF FF FF FF FF FF | Just '0' to prevent erasure on legacy | 68' |
| X+13 | Capability/Configuration Identifier | FF | No record pointer | 70 |
| X+14 | Extension1 Record Identifier | 02 | EXT1 to record 2 | 72' |

FIG. 10

METHOD OF STORING E-MAIL ADDRESS INFORMATION ON A SIM CARD

FIELD OF THE INVENTION

The present invention is directed toward a method of storing e-mail addresses on a SIM (Subscriber Identity Module) card and, more particularly, toward a method of storing e-mail address information on a SIM card permitting backward compatibility with existing mobile communications devices.

BACKGROUND OF THE INVENTION

With the introduction of GSM (Global System for Mobile communication) and PCS (Personal Communication System) systems, a number of advanced subscriber features and applications have been made available to mobile subscribers. One such advanced feature is conventionally known as a Subscriber Identity Module (SIM) card, which is attachable to a mobile communications device.

A SIM card provides a mobile subscriber with a detachable memory unit in which to store necessary mobile subscriber information and freely associate the stored information with other mobile communications devices. The information stored on the SIM card may include subscription information concerning a mobile subscriber's subscription with a wireless service provider and/or user specified information. For example, such information may include a mobile subscriber's Mobile Station Integrated Service Digital Network (MSISDN) number, commonly referred to as a directory number, authentication keys, SMS (Short Message Service) messages, phone books, speed dialing lists, screening lists, billing charge numbers, etc.

For example, if communications standard required subscription information, necessary for proper multi-mode operation in one of a number of available different types of terrestrial (such as GSM) or satellite (such as ACeS) cellular communications systems, is stored on the SIM card, a mobile subscriber may insert their SIM card into another mobile communications device and have immediate access to those subscriptions allowing them to make and receive cellular telephone calls. This provides a mobile subscriber with the ability to easily change mobile communications devices when roaming in an area with a different frequency range or wireless technology (also called "plastic roaming"), providing a mobile subscriber with access to telecommunications services substantially throughout the world.

Additionally, as previously noted, the SIM card may also used to store subscriber specific operational data, such as a phone book, speed dial numbers, screening lists, billing numbers, etc. By storing this information on the SIM card, a subscriber can operate various mobile communications devices and still retain pertinent personal information, such as, phone books, speed dial lists, screening lists, billing charge numbers, etc. This eliminates the need of having to reprogram phone numbers and other information each time a different mobile communications device is used by the subscriber, and enables a single customer account for multiple phones or other wireless communications devices.

Further, as mobile communications devices, and particularly cellular phones, are updated, providing such storage on the SIM card enables a subscriber to purchase the new model without having to update any personal, account or service information. The subscriber can just move the SIM card from the old mobile communications device to the new mobile communications device without having to update or reprogram pertinent subscriber information.

To provide for the storage of phone numbers, each SIM card includes a definition of Abbreviated Dialing Numbers (ADNs), which is a set of records of personal contact information. The storage definition for each ADN record basically includes a phone number for the particular contact and an alphanumeric tag to enable the subscriber to easily identify the particular contact, as well as other system identification information. At the present time, there is no capability to store an e-mail address associated with a particular contact within the ADN record on the SIM card. While e-mail address information may be stored on the semi-permanent memory resident within the mobile communications device itself, this information becomes unavailable to a subscriber when the SIM card is used with a different mobile communications device. This requires the subscriber to reprogram e-mail address information each time a new mobile communications device is utilized. It would thus be advantageous to provide for the storage of all personal contact information, including alphanumeric tags, phone numbers, e-mail addresses, etc., on the SIM card, since it is the SIM card and not the mobile communications device that typically follows the subscriber.

The present invention is directed toward overcoming one or more of the above-mentioned problems.

SUMMARY OF THE INVENTION

A method of storing an e-mail address within an Abbreviated Dialing Number (ADN) record of a Subscriber Identity Module (SIM) card is provided. The ADN record typically includes a plurality of fields having personal contact information related to a contact stored in the ADN record. The inventive method includes the steps of allocating a first number of bytes of memory space to a first field in the ADN record, storing an e-mail address of a contact in the first field in the ADN record, and setting a flag in a second field in the ADN record indicating a presence of a e-mail address in the first field in the ADN record.

Typically, the first number of bytes allocated to the first field in the ADN record is equal to or less than 241 bytes.

In one form, the first field in the ADN record where the e-mail address is stored includes an Alpha Identifier field, and the second field in the ADN record where the flag is set includes a Type of Number/Numbering Plan Identification (TON/NPI) field. The flag indicating the presence of an e-mail address and the Alpha Identifier field is set in an NPI portion of the TON/NPI field.

In another form, the NPI portion of the TON/NPI field includes four binary bits. The step of setting a flag in the TON/NPI field indicating the presence of a e-mail address in the Alpha Identifier field includes setting the NPI portion or the TON/NPI field equal to binary "1110".

The ADN record also includes a third field for storing a dialing number associated with the contact. In one embodiment of the inventive method, the third field in the ADN record is coded as unused, whereas, in another embodiment of the inventive method, an invalid phone number is stored in the third field in the ADN record.

A first preselect byte of memory is typically allocated in the Alpha Identifier field for identifying another ADN record containing a phone number for the contact. In addition to containing a phone number, this another ADN record may further include an alphanumeric tag associated with the contact.

A second preselect byte in the Alpha Identifier field in the ADN record is typically allocated for identifying an extension record containing a remaining portion of the e-mail address if the first number of bytes of memory allocated to the Alpha Identifier field is insufficient to store the e-mail address. Whether or not an extension record will be needed is dependent upon both the length of the e-mail address to be stored and the number of bytes of memory allocated to the Alpha Identifier field.

The ADN record also includes a fourth field for storing an extension record identifier. The extension record identifier in the fourth field and the second preselect byte in the Alpha Identifier field each identify the same extension record which contains the remaining portion of the e-mail address if the first number of bytes of memory space allocated to the Alpha Identifier field is insufficient to store the e-mail address.

A third preselect byte of memory In the Alpha Identifier field may be allocated for identifying a length of the e-mail address stored in the Alpha Identifier field. If memory space in the Alpha Identifier field permits, an alphanumeric tag associated with the particular contact may also be stored in the Alpha Identifier field in the ADN record.

It is an object of the present invention to provide a method for storing e-mail address information on a SIM card.

It is a further object of the present invention to provide a method for storing e-mail address information on a SIM card without adding memory space to the SIM card.

It is yet a further object of the present invention to provide a method of storing e-mail address information on a SIM card, while permitting backwards compatibility of the SIM card with mobile stations not readily configured to display the e-mail address information.

Other aspects, objects and advantages of the present invention can be obtained from the study of the application, the drawings, and the appended claims.

BRIEF DESCRIPTION OF THE DRAWINGS

FIG. 3 illustrates the storage allocation of a conventional ADN record on a SIM card;

FIG. 4 illustrates the bit allocation for the storage of digits in the ADN record of FIG. 3;

FIG. 6 illustrates ADN record storage allocation in accordance with the present inventive method;

FIG. 7 illustrates the storage allocation on an extension record according to the present inventive method;

FIG. 8 illustrates a byte of storage space in the TON/NPI field of the ADN record shown in FIG. 6;

FIG. 9 illustrates an alternate storage allocation for an ADN record in accordance with the present inventive method; and FIG. 10 illustrates the storage allocation for an ADN record in accordance with an alternate embodiment of the present inventive method.

DETAILED DESCRIPTION OF THE INVENTION

Figure 1:
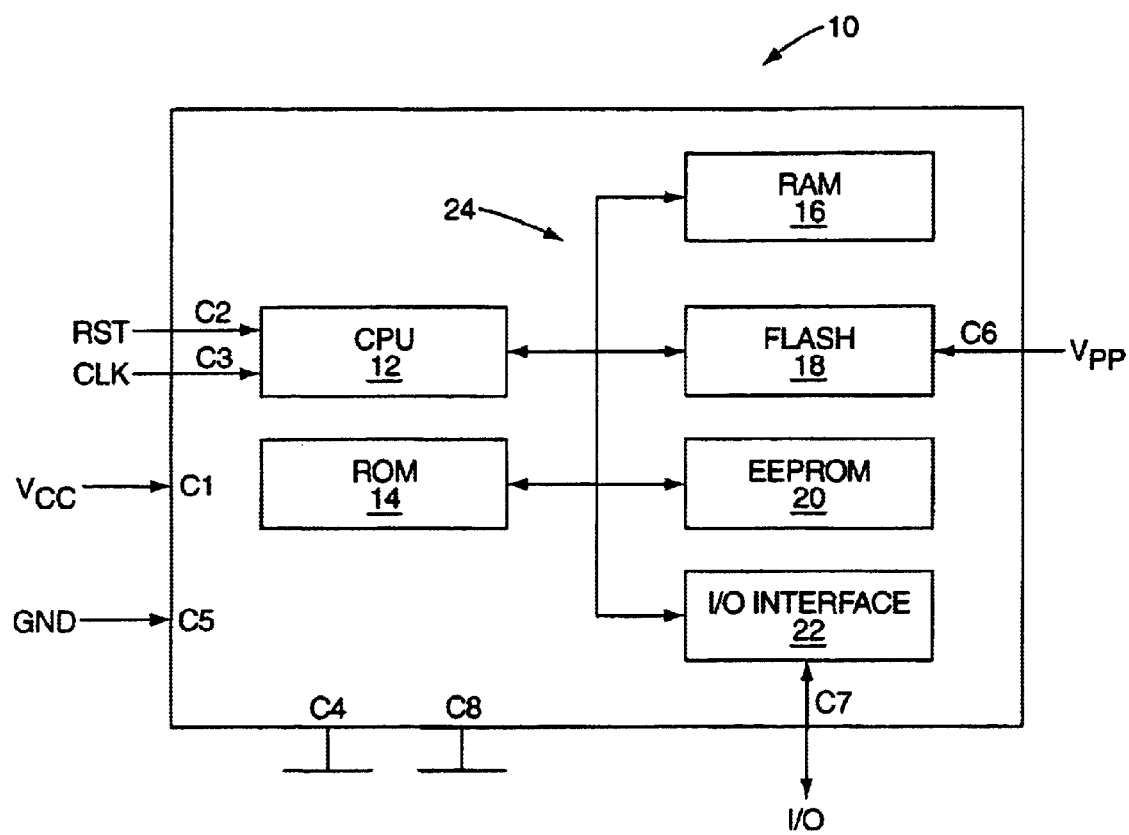
FIG. 1 is a block diagram of a SIM card for practicing the inventive method.

FIG. 1 illustrates a SIM card shown generally at 10. The SIM card 10 includes a Central Processing Unit (CPU) 12, a Read Only Memory (ROM) 14, a Random Access Memory (RAM) 16, a Flash memory 18, an Electrically Erasable Programmable Read Only Memory (EEPROM) 20 and a serial input/output (I/O) interface 22, all interconnected via a data bus 24. The SIM card 10 interfaces with the mobile station (not shown) via an eight contact layout C1–C8. Specifically, contact C1 is connected to a supply voltage (Vcc), contact C2 receives a reset signal (RST), contact C3 receives a clock signal (CLK), contact C5 is connected to ground (GND), contact C6 is connected to a programming voltage (Vpp) and contact C7 is connected to an I/O interface of the mobile station. As shown in FIG. 1, contacts C4 and C8 on the SIM card 10 are unused.

The CPU 12 is the heart of the SIM card 10 and performs the actual data processing operations, and basically controls operation of the SIM card 10. The ROM 14 contains the operating system of the SIM card 10, which is burned in to the ROM 14 so that it cannot be changed during the life of the SIM card 10. The RAM 16 is the CPU's 12 working volatile memory. All data stored in the RAM 16 is lost when power to the SIM card 10 is switched off. The EEPROM 20 is a non-volatile memory. Data can be written to and read from the EEPROM 20 under the control of the CPU 12. Data stored in the EEPROM 20 survives power cycles, and thus is not lost when power to the SIM card 10 is switched off. The various elementary files associated with the SIM card 10, such as Abbreviated Dialing Number (ADN) and Extension (EXT) records are stored in the EEPROM 20. The Flash memory 18 is a non-volatile program memory. Program code can be written to and read from the Flash memory 18 under the control of the CPU 12. Similar to the EEPROM 20, the program code stored in the Flash memory 18 survives power cycles and is not erased when power to the SIM card 10 is switched off. However, one difference between the Flash memory 18 and the EEPROM 20 is that program code in the Flash memory 18 is erased all at once, while data stored in the EEPROM 20 can be erased only one byte at a time. The I/O interface 22 may be a conventional ISO 7816 serial input/output interface used for communication between the mobile station (not shown) and the CPU 12.

Figure 2:
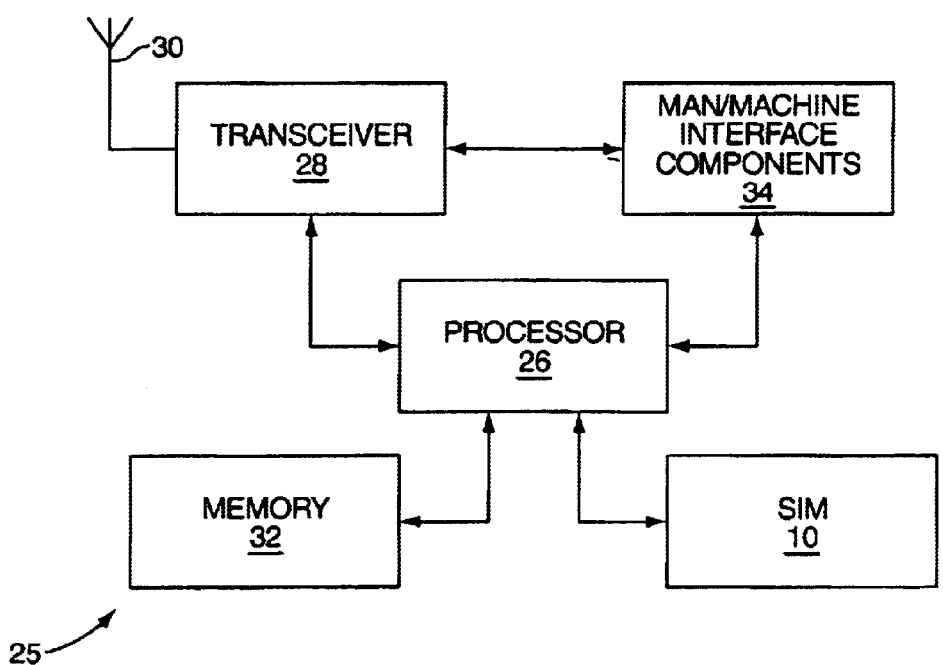
FIG. 2 is a block diagram of a mobile station incorporating the SIM card shown in FIG. 1.

FIG. 2 is a block diagram of a mobile station, shown generally at 25, incorporating the SIM card 10 shown in FIG. 1. The mobile station 25 includes a processor 26 connected to a transceiver 28. The transceiver 28 may include one or more transceivers each configured to operate in one or more frequency bands of one or more cellular telecommunications systems. An antenna 30 is connected to the transceiver 28 for transmitting and receiving wireless communication signals (both voice and data) over a cellular telecommunications system. The cellular telecommunications system may include, for example, satellite transceivers, base stations, etc. A memory 32 is connected to the processor 26, and is used for storing programs and other data executed by the processor 26 for controlling operation of the mobile station 25. The SIM card 10 is connected to the processor 26 via the eight contacts C1–C8 shown in FIG. 1. The mobile station 25 also includes conventional man/machine interface components 34 connected to the transceiver 28 and processor 26, permitting a subscriber to utilize the mobile station 25. These man/machine interface components 34 may include, for example, a microphone, a speaker, keypad, display, etc., whose nature, operation and interconnection with the components illustrated in FIG. 2 are well known to one of ordinary skill in the art.

In operation, subscriber specific information such as phone numbers and alphanumeric tags associated with the phone numbers are stored on the SIM card 10 in the EEPROM 20. Since the SIM card 10 typically follows the subscriber, the SIM card 10 may be inserted into a new mobile station without having to reprogram this phone book information. If e-mail addresses are desired, they are typically stored in the memory 32 of the mobile station 25. However, these e-mail addresses, as well as any other information stored on the memory 32 of the mobile station 25, are unavailable to a subscriber when the SIM card 10 is used in another mobile station The inventive method overcomes this drawback.

The SIM card 10 includes a set of records of personal contact information known as Abbreviated Dialing Number (ADN) records. Each ADN record's storage definition basically only includes an alphanumeric tag and one phone number. FIG. 3 illustrates an exemplary ADN record shown generally at 36. The ADN record 36 includes a plurality of fields for storing personal contact information and containing identifiers of associated network/bearer capabilities and identifiers of extension records. The ADN record 36 includes an introductory field 38 which contains various identification information associated with the ADN record 36. Information in the introductory filed 38 is typically provided by the manufacturer of the SIM card 10. For example, the introductory field 38 will include information related to the identification of the ADN record at 40, the structure of the ADN record at 42 (all ADN records are typically linear fixed), whether the file of the ADN record is optional or mandatory at 44, the length of the ADN record at 46, the update activity of the ADN record at 48, and various access condition information associated with the ADN record at 50.

The ADN record 36 also includes a plurality of user-defined fields 52 used by a subscriber for storing personal contact information. For convenience, each field is divided into four columns in FIG. 3, with the particular order of each field in the ADN record 36 provided in column 54, a description of each field in column 56, whether the field is mandatory or optional in column 58, and the length of each field, in bytes, provided in column 60. A detailed description of each of the fields 52 is provided below.

An Alpha Identifier field 62 is provided for alphanumeric tagging of an associated dialing number stored in the ADN record 36. The Alpha Identifier field 62 is X bytes in length, with the value of X allocated by the SIM card manufacturer. The value of X may be set equal to, or less than, 241 bytes. As indicated in the mandatory/optional column at 58, the Alpha Identifier field 62 is an optional field in the ADN record 36; all of the other fields are mandatory. A BCD number/SSC content field 64 provides an indication of the number of bytes of memory in the following two data fields containing actual BCD number/SSC information. Since each of the fields in the ADN record 36 has a fixed length, the maximum value stored in the BCD number/SSC content field 64 is eleven. The BCD number/SSC content field 64 is one byte in length. A TON/NPI field 66 is provided for identifying the type of number stored in the ADN record 36 and the numbering plan utilized by an associated wireless network. The TON/NPI field 66 is one byte in length. A dialing number/SSC string field 68 is provided for storing up to twenty digits of the telephone number and/or SSC information (two digits per byte). If the telephone number or SSC information is longer than twenty digits, the first twenty digits are stored in the dialing number/SSC string field 68 and the remainder is stored in an associated extension record.

FIG. 4 illustrates the storage of digits in the dialing number/SSC string field 68. Each byte includes eight binary bits b8–b1 for the storage of two digits. The first digit of the pair is stored in bits b4–b1, with the next consecutive digit of the pair stored in bits b8–b5. Thus, for byte X+3 shown in FIG. 4, the first digit is stored in bits b4–b1, and the second digit is stored in bits b8–b5. Similarily, in byte X+4, the third digit is stored in bits in b4–b1, and the fourth digit is stored in bits b8–b5. The remaining fifth through twentieth digits are stored in bytes X+5 through X+12 in a similar manner, with each digit stored in accordance with conventional BCD encoding.

Referring back to FIG. 3, a capability/configuration identification field 70 identifies the number of a record containing associated capabilities/configuration parameters required for the call. The capability/configuration identifier field 70 is one byte in length. An extension record identifier field 72 identifies the identification number of an extension record containing additional data. For example, if a dialing number/SSC string was longer than twenty digits, the extension record identifier field 72 would identify the extension record where the remainder of the information could be located. The extension record identifier field 72 is one byte in length.

Figure 5:
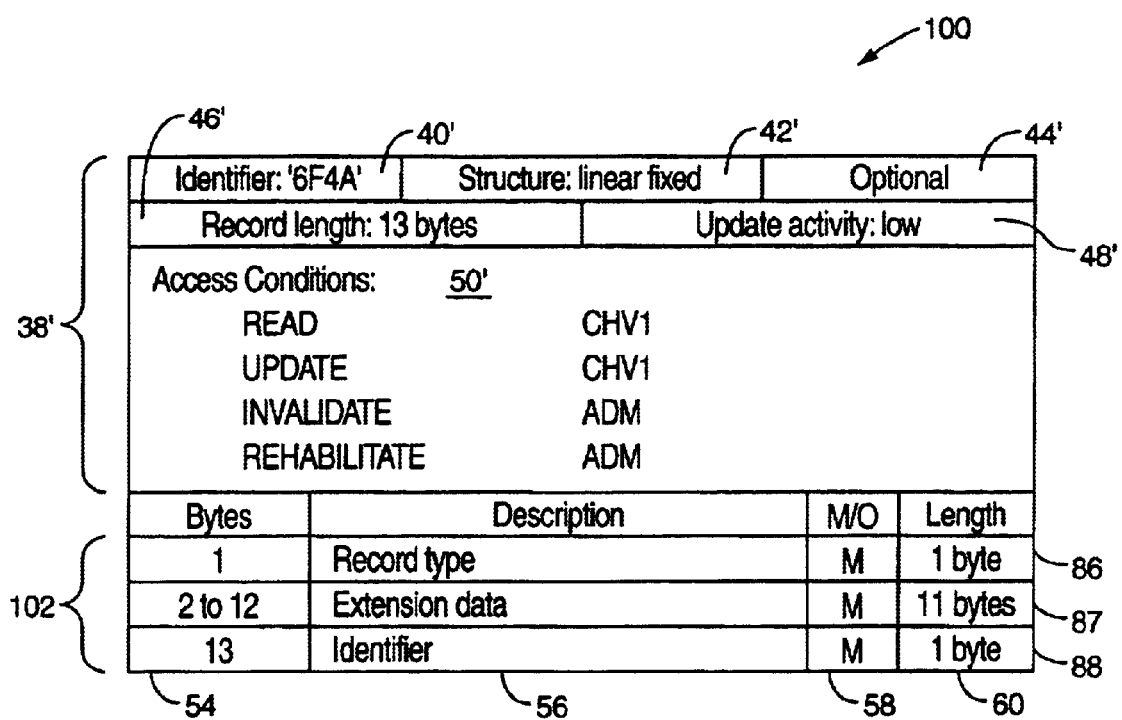
FIG. 5 illustrates the storage allocation for a conventional extension (EXT) record on a SIM card.

FIG. 5 illustrates an exemplary extension (EXT) record shown generally at 100. The EXT record 100 includes a plurality of fields for storing extension data and containing identifiers of associated network/bearer capabilities and identifiers of further extension records. Similar to the ADN record 36 (see FIG. 3), the EXT record 100 includes an introductory field 38' which contains various identification information associated with the EXT record 100. Information in the introductory field 38' is typically provided by the manufacturer of the SIM card 10. For example, the introductory field 38' will include information related to the identification of the EXT record at 40', the structure of the EXT record at 42' (all EXT records are typically linear fixed), whether the file of the EXT record is optional or mandatory at 44', the length of the EXT record at 46', the update activity of the EXT record at 48', and various access condition information associated with the EXT record at 50'.

The EXT record 100 also includes a plurality of user-defined fields 102 used by a subscriber for storing extension data information. For convenience, each field is divided into the four informational columns 54, 56, 58 and 60 shown in the ADN record 36 of FIG. 3.

As shown in FIG. 5, a record type field 86 is provided for identifying the type of information that is contained in the EXT record 100. The record type field 86 is one byte in length. An extension data field 87 is provided for storing the actual extension data of the EXT record 100. The extension data field is eleven bytes in length: An identifier field 88 is provided for identifying an additional EXT record if the extension data field 87 does not include sufficient memory space to store the desired extension data.

As illustrated in FIG. 5, the EXT record 100 is typically thirteen bytes in length, with the byte allocation for each of the mandatory fields 86, 87 and 88 being generally as shown in FIG. 5. The data in the extension data field 87 is conventionally coded in accordance with its type, as identified in the record type field 86.

The ADN record 36 shown in FIG. 3 is typically intended for phone number storage only. There is no possibility to store an e-mail address in the dialing number/SSC string field 68, since the dialing number in the dialing number/SSC string field 68 is BCD encoded, using four bits for each digit. Also, there is currently no method to indicate an e-mail address with the TON/NPI field 66 according to conventional GSM standards. Even if an e-mail address could somehow be encoded within the dialing number/SSC string field 68, there would be a need to denote the presence of the e-mail address instead of a normal phone number. However, storage of anything other than a normal phone number in the dialing number/SSC string field 68 would not be backward compatible, since existing mobile communications devices display the dialing number according to BCD encoding. The e-mail address would be read as a phone number by the mobile communications device, causing user confusion and perhaps errant calls. The present invention provides a method to store e-mail addresses in the ADN record without encountering the above-mentioned problems. Further, the present inventive method allows the SIM card 10 upon which such e-mail address information is stored to be backward compatible with existing mobile equipment not equipped for such e-mail address detection and display.

FIG. 6 illustrates an ADN record, shown at 74, incorporating the inventive method for storing e-mail addresses on a SIM card. The ADN record 74 shown in FIG. 6 illustrates the storage of the e-mail address "sample@not.real". As shown in FIG. 6, the length of the Alpha Identifier field 62 has been set equal to fourteen bytes, with each byte consisting of eight binary bits. In order to permit for the storage of an e-mail address in the ADN record 74, the Alpha Identifier field 62 is divided into subfields, consisting of an associated ADN record indicator 76, an extension record indicator 78, an address length indicator 80, and an e-mail address field 82. Preferably, the Alpha Identifier field 62 is coded in accordance with the SMS default 7-bit coded alphabet as defined in GSM 03.38 standards, with bit 8 set to 0. For convenience, the values stored in the various fields are shown in column 84 as hexadecimal values, with column 85 providing an explanation of the stored data. Unused bytes are set to "FF".

As shown in the ADN record 74 of FIG. 6, the associated ADN record indicator 76 is provided in the first byte of the Alpha Identifier field 62. The associated ADN record indicator 76 identifies another ADN record in the SIM card 10 which contains a phone number and/or alpha tag for the contact whose e-mail address is stored in the ADN record 74. In the example shown in FIG. 6, this information is contained in ADN record 3.

The extension record indicator 78 is provided in the second byte of memory in the Alpha Identifier field 62. The extension record indicator 78 identifies an Extension (EXT) record in the SIM card 10 containing the remaining portion of the e-mail address if the memory space allocated to the Alpha Identifier field 62 is insufficient to store the entire e-mail address. In the particular example in FIG. 6, the entire e-mail address is not stored in the Alpha Identifier field 62 and the remaining portion is identified as being located in EXT record 2.

The address length indicator 80 is provided in the third byte of memory in the Alpha Identifier field 62. The address length indicator 80 indicates the number of the following bytes of memory space in the Alpha Identifier field 62 which include the e-mail address. In the example of FIG. 6, the address length indicator 80 indicates that the following eleven bytes of memory space include the e-mail address.

The e-mail address is provided in the e-mail address field 82, which immediately follows the address length indicator field 80. As shown in the example in FIG. 6, the Alpha Identifier field 62 does not include sufficient memory space to store the entire e-mail address. Only the first eleven characters of the e-mail address, namely "sample@not." are capable of being stored in the e-mail address field 82 of the Alpha Identifier field 62. As identified in the extension record indicator 78, the remaining portion of the e-mail address is stored in EXT record 2, which is shown in FIG. 7.

FIG. 7 illustrates the information stored in EXT record 2. Each extension record includes three fields, namely, a record type field 86, an extension data field 87, and an identifier field 88. Each extension record is typically thirteen bytes in length, with one byte allocated for the record type field 86, eleven bytes allocated for the extension data field 87, and one byte allocated for the identifier field 88. The record type field 86 is used to identify the type of information that is contained in the extension data field 87. The identifier field 88 is used to identify further extension records containing additional information if the extension data field 87 does not include sufficient memory to store all of the desired data.

As shown in FIG. 7, the record type field 86 is coded with a hex value of "02" to indicate that additional data is stored in the extension data field 87. The first byte of memory in the extension data field 87 indicates the following length of memory space containing pertinent data. In the above example, since only the last four characters of the e-mail address, "real", need to be stored, the first byte of the extension data field 87 is coded "04" indicating that next four bytes of memory include pertinent data. Since the last six bytes of memory in the extension data field 87 are not needed, they are coded as unused "FF". Further, since all pertinent data is stored in the extension data field 87, no further extension records are needed and the identifier field 88 is also coded as unused "FF".

Referring back to FIG. 6, the BCD number/SSC content field 64 is one byte in length and indicates the number of bytes of the following data items contain the actual BCD/SSC information. In the example of FIG. 6, the BCD number/SSC content field 64 is coded "01" indicating that only the following byte of memory space (the TON/NPI field 66) contains actual BDC/SSC information.

The TON/NPI field 66 is coded "8E" indicating that an e-mail address is stored in the Alpha Identifier field 62. The binary representation for the TON/NPI field 66 is shown in FIG. 8. The binary bit b8 is set to binary "1". Binary bits b7, b6 and b5 represent the TON portion of the TON/NPI field 66 and are set to binary "000". Binary bits b4, b3, b2 and b1 are the NPI portion of the TON/NPI field 66 and are set to binary "1110" indicating the presence of an e-mail address in the Alpha Identifier field 62. The binary value of "1110" stored in the NPI portion of the TON/NPI field 66 is used as a flag for the mobile station software indicating that an e-mail address is present in the Alpha Identifier field 62. This value of "1110" is a reserved value for alphanumeric Internet address information reserved in GSM.

Referring back to FIG. 6, since the ADN record 74 is used for storing an e-mail address, the dialing number/SSC string field 68 is coded as unused "FF". Thus, since the dialing number string is empty, there is no possibility of the mobile phone dialing a wrong number. Further, coding the dialing string as unused permits the SIM card 10 to be backward compatible since current mobile GSM products do not display contact information when the dialing number field is empty, regardless of the content of the Alpha Identifier field 62. Therefore, any mobile equipment that displays contact information will have no phone number shown, thus disallowing misplaced calls. Mobile phones equipped according to the present inventive method, will be alerted by the flag in the NPI portion of the TON/NPI field 66 indicating the presence of an e-mail address and be equipped with software and other elements to identify and display the e-mail address stored in the Alpha Identifier field 62.

The capability/configuration identifier field 70 is coded as unused "FF", since it is not needed when storing an e-mail address in the ADN record 74. Similarly, the extension record identifier field 72 is coded as unused "FF", since the second byte of memory in the Alpha Identifier field 62 has already been allocated to point to an extension record if necessary.

FIG. 9 illustrates an alternate embodiment of the ADN record 74 shown in FIG. 6, indicated at 74', with like elements indicated with the same reference number and elements that have been modified indicated with a prime ('). Basically, the only difference between the ADN record 74 shown in FIG. 9 and that shown in FIG. 6 is that the Alpha Identifier field 62' has been allocated twenty-four bytes of memory space instead of fourteen. The remaining fields in the ADN record 74' include the same information as previously described with respect to FIG. 6.

As shown in FIG. 9, the associated ADN record indicator 76' is coded as unused "FF" indicating that there is no existing associated ADN record including contact information associated with the e-mail address. Similarly, the extension record indicator 78' is also coded as unused "FF" indicating that there is no extension record associated with the ADN record 74'. The address length field 80' is coded "0F" to indicate the that following fifteen bytes of information include the e-mail address. In this particular example, since the allocated memory space of the Alpha Identifier field 62' is sufficient to store the entire e-mail address, the entire e-mail address "sample@not.real" is stored in the Alpha Identifier field 62'. Any remaining portions of the Alpha Identifier field 62' may be utilized for alpha tagging, as shown at 90. This alpha tag will appear on the display of the mobile station when it is equipped with software to read the e-mail address from the Alpha Identifier field 62' It will typically be transparent to existing mobile stations. The remaining fields in FIG. 9 include the same information as previously described with respect to FIG. 6, and no further discussion is necessary.

One drawback with storing e-mail addresses in accordance with the embodiments shown in FIGS. 6 and 9, is that current existing mobile stations consider ADN records as empty if no contact phone number is entered in the dialing number/SSC string field 68. Thus, current mobile equipment may overwrite these ADN records 74 and 74' if new contact phone numbers are entered, since the mobile station will consider the ADN record as available since no dialing number is present. This would cause the loss of the e-mail address if the SIM card 10 were used in such existing mobile stations. When the SIM card 10 is returned to a mobile station that implements the inventive method, the e-mail address stored on the SIM card 10 would no longer exist and would have to reentered (assuming it was overwritten). Accordingly, an alternative has been provided to avoid such overwriting.

As shown in FIG. 10, an ADN record 92 is provided which avoids such overwriting. The ADN record 92 shown in FIG. 10 is similar to the ADN record 74 shown in FIG. 6, with like elements indicated with the same reference number and elements requiring modification indicated with a prime ('). Specifically, the first byte of the dialing string in the dialing number/SSC string field 68' is coded "F0". The "0" is included as the first digit of the dialing number to prevent an erasure of the ADN record 92 in existing mobile equipment. By placing a "0" at the first digit of the dialing string, the mobile station will recognize that a dialing number is present, but will realize that it is an invalid number Further, since the first digit is provided as a "0", the BCD number/SSC content field 64' is coded "02" indicating that the next two bytes of memory space include actual BCD/SSC information This would identify the TON/NPI field 66 and the first digit of the dialing string. Further, the extension record identifier field 72' is coded "02", which is the same coding as the extension record indicator 78. Both point to the same extension record (EXT record 2) in the SIM card 10 which contains extension data relative to the stored e-mail address. In the particular example of FIG. 10, the extension record identified by the extension record identifier field 72' and the extension record identifier 78 are the same EXT record 2 as shown and previously described with respect to FIG. 7.

The example shown in FIG. 10 prevents an existing mobile station from overwriting the ADN record 92 by placing a fake number "0" in the first digit of the dialing number/SSC string 68'. Also, the extension record identifier field 72' is coded "02" to prevent an existing mobile station from overwriting the corresponding extension record (EXT record 2).

The present inventive method as described herein allows for storage of e-mail addresses on the SIM card, along with most other subscriber specific parameters and data. In each of the above-described methods, an e-mail address can easily be associated with an existing contact that already has a phone number stored on the SIM card. Since no changes are required to the SIM card itself, all existing SIM cards that contain ADN and extension (EXT) records can be used to store e-mail addresses. Further, the inventive methods provide the advantage that they are transparent, or at least semi-transparent, backward compatible with existing mobile stations that are not equipped to identify and display e-mail address information. Once storage space on the SIM card is exhausted, e-mail addresses can be stored on the memory of the mobile unit as is currently practiced.

While the present invention has been described with particular reference to the drawings, it should be understood that various modifications could be made without departing from the spirit and scope of the present invention.

I claim:

1. A method of storing an e-mail address within an Abbreviated Dialing Number (ADN) record of a Subscriber Identity Module (SIM) card, the ADN record including a plurality of fields having personal contact information relating to a contact stored in the ADN record, said method comprising the steps of:

allocating a first number of bytes of memory space to a first field in the ADN record;

storing an e-mail address of a contact in the first field in the ADN record;

setting a flag in a second field in the ADN record indicating a presence of an e-mail address in the first field in the ADN record;

allocating a third byte from said first number of bytes in the first field in the ADN record for identifying a length of the e-mail address stored in the field;

wherein the second field in the ADN record comprises a Type of Number/Numbering Plan Identification (TON/NPI) field; and wherein an NPI portion of the TON/NPI field includes four binary bits, and wherein in the step of setting a flag in the second field in the ADN record indicating the presence of an e-mail address in the first field in the ADN record comprises the step of setting the NPI portion of the TON/NPI field equal to binary "1110".

2. The method of claim 1, wherein the first number of bytes allocated to the first field in the ADN record is equal to or less than 241 bytes.

3. The method of claim 1, wherein the first field in the ADN record comprises an Alpha Identifier field.

4. The method of claim 1, wherein the flag indicating the presence of an e-mail address is the first field in the ADN record is set in an NPI portion of the TON/NPI field.

5. The method of claim 1, wherein the ADN record includes a third field for storing a dialing number associated with the contact, and wherein the method further comprises the step of coding the third field in the ADN record as unused.

6. The method of claim 1, wherein the ADN record includes a third field for storing a dialing number associated with the contact, and wherein the method further comprises the step of storing an invalid phone number in the third field in the ADN record.

7. The method of claim 1, wherein the method further comprises the step of allocating a first byte in the first field in the ADN record for identifying a second ADN record containing a phone number for the contact.

8. The method of claim 7, wherein the second ADN record further includes an alphanumeric tag associated with the contact.

9. The method of claim 1, wherein the method further comprises the step of allocating a second byte in the first field in the ADN record for identifying an extension record containing a remaining portion of the e-mail address if the first number of bytes of memory space allocated to the first field in the ADN record is insufficient to store the e-mail address.

10. The method of claim 9, wherein the ADN record includes a fourth field for storing an extension record identifier, wherein the extension record identifier in the fourth field and the second byte in the first field each identify the extension record containing the remaining portion of the e-mail address if the first number of bytes of memory space allocated to the first field in the ADN record is insufficient to store the e-mail address.

11. The method of claim 1, wherein the method further comprises the step of additionally storing an alphanumeric tag associated with the contact in the first field in the ADN record.

12. A method of storing an e-mail address within an Abbreviated Dialing Number (ADN) record of a Subscriber Identity Module (SIM) card, the ADN record storing subscriber-specific contact information relating to subscriber contacts and including a Dialing Number field having a first number of bytes of memory space for typically storing a phone number associated with a subscriber contact and an Alpha Identifier field having a second number of bytes of memory space for typically storing a subscriber-defined alphanumeric tag associated with the subscriber contact, said method comprising the steps of:

storing an e-mail address in the Alpha Identifier field of the ADN record associated with a particular subscriber contact;

setting a flag in the ADN record indicating a presence of an e-mail address in the Alpha Identifier field;

allocating a third byte from said first number of bytes in the Alpha Identifier field in the ADN record for identifying a length of the e-mail address stored in the Alpha Identifier field;

wherein the ADN record further includes a Type of Number/Numbering Plan Identification (TON/NPI) field, and wherein the flag setting step comprises setting a flag in the TON/NPI field indicating a presence of an e-mail address in the Alpha Identifier field; and wherein an NPI portion of the TON/NPI field includes four binary bits, and wherein the step of setting a flag in the TON/NPI field indicating the presence of an e-mail address in the Alpha Identifier field comprises setting the NPI portion of the TON/NPI field equal to binary "1110".

13. The method of claim 12, wherein the flag set in the TON/NPI field indicating the presence of an e-mail address in the Alpha Identifier field is set in an NPI portion of the TON/NPI field.

14. The method of claim 12, wherein the second number of bytes of memory space in the Alpha Identifier field is equal to or less than 241 bytes.

15. The method of claim 12, further comprising the step of coding the Dialing Number field as unused.

16. The method of claim 12, further comprising the step of storing an invalid phone number in the Dialing Number field.

17. The method of claim 12, further comprising the step of allocating a first byte in the Alpha Identifier field for identifying a second ADN record including a phone number for the particular subscriber contact.

18. The method of claim 17, wherein the second ADN network further includes a subscriber-defined alphanumeric tag associated with the particular subscriber contact.

19. The method of claim 12, further comprising the step of allocating a second byte in the Alpha Identifier field for identifying an extension record containing a remaining portion of the e-mail address if the second number of bytes of memory space allocated to the Alpha Identifier field in the ADN record is insufficient to store the e-mail address.

20. The method of claim 19, wherein the ADN record includes an Extension Record field for storing an extension record identifier, wherein the extension record identifier in the Extension Record field and the allocated second byte in the Alpha Identifier field each identify the extension record containing the remaining portion of the e-mail address if the second number of bytes of memory space allocated to the Alpha Identifier field in the ADN record is insufficient to store the e-mail address.

21. The method of claim 12, further comprising the step of additionally storing a subscriber-defined alphanumeric tag associated with the particular subscriber contact in the Alpha Identifier field in the ADN record.

* * * * *